(12) United States Patent
Talerico et al.

(10) Patent No.: US 10,579,032 B2
(45) Date of Patent: Mar. 3, 2020

(54) POWER DISTRIBUTION UNIT INTERFACE SYSTEM

(71) Applicant: Red Hat, Inc., Raleigh, NC (US)

(72) Inventors: Joseph D. Talerico, Raleigh, NC (US); William W. Foster, Jr., Raleigh, NC (US); Kambiz Aghaiepour, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 71 days.

(21) Appl. No.: 15/903,739

(22) Filed: Feb. 23, 2018

(65) Prior Publication Data

US 2019/0265666 A1   Aug. 29, 2019

(51) Int. Cl.
*G05B 19/042* (2006.01)

(52) U.S. Cl.
CPC .. *G05B 19/0423* (2013.01); *G05B 2219/2639* (2013.01)

(58) Field of Classification Search
CPC ... G05B 19/0423; G06F 13/387; G06F 1/189; G06F 1/266
See application file for complete search history.

(56) References Cited

U.S. PATENT DOCUMENTS

| | | | | |
|---|---|---|---|---|
| 7,774,443 | B2 * | 8/2010 | Ewing | G06F 1/26 340/693.1 |
| 8,694,810 | B2 | 4/2014 | Ahluwalia et al. | |
| 9,557,792 | B1 | 1/2017 | Potlapally et al. | |
| 2003/0204612 | A1 * | 10/2003 | Warren | H04L 41/0273 709/230 |
| 2006/0031447 | A1 * | 2/2006 | Holt | H04L 41/00 709/223 |
| 2006/0282688 | A1 * | 12/2006 | Bahali | G06F 1/3203 713/300 |
| 2009/0113323 | A1 * | 4/2009 | Zhao | G06Q 10/10 715/764 |
| 2010/0019575 | A1 * | 1/2010 | Verges | H02J 3/14 307/38 |
| 2011/0016342 | A1 * | 1/2011 | Rowan | G06F 11/3006 713/340 |
| 2011/0218689 | A1 * | 9/2011 | Chan | G01R 21/00 700/295 |

(Continued)

OTHER PUBLICATIONS

Author Unknown, "Data Center Power Management: What Makes an iPDU an iPDU?," Sunbird DCIM, Aug. 11, 2017, 3 pages, https://www.sunbirddcim.com/blog/data-center-power-management-what-makes-ipdu-ipdu.

(Continued)

*Primary Examiner* — Tim T Vo
*Assistant Examiner* — Phong H Dang
(74) *Attorney, Agent, or Firm* — Withrow & Terranova, PLLC

(57) ABSTRACT

A power distribution unit (PDU) interface system is disclosed. The PDU interface system receives, from an initiator, an input request associated with a PDU that includes a plurality of ports. The PDU is a first PDU type of a plurality of PDU types. The input request has a same syntax for each of the PDU types. It is determined that the PDU is the first PDU type of the plurality of PDU types. Based on the first PDU type, a first PDU-type input command is initiated to the PDU. The first PDU-type input command implements the input request on the PDU and has a different syntax than the input request.

9 Claims, 8 Drawing Sheets

(56) References Cited

U.S. PATENT DOCUMENTS

| | | | |
|---|---|---|---|
| 2011/0245988 A1 | 10/2011 | Ingels et al. | |
| 2014/0001887 A1* | 1/2014 | Ramamurthy | H02J 3/005 307/151 |
| 2014/0257740 A1* | 9/2014 | Hamann | G01K 1/02 702/130 |
| 2016/0313780 A1 | 10/2016 | Stewart et al. | |
| 2017/0262032 A1* | 9/2017 | Xia | G06F 1/263 |

OTHER PUBLICATIONS

Author Unknown, "Nodegrid Manager," ZPE Systems, Vendor Neutral IT Asset Management, available at least as early as Nov. 27, 2017, 4 pages, https://www.zpesystems.com/products/nodegrid-manager/.

Author Unknown, "Power Management via Console Servers," Opengear Console Servers, available at least as early as Nov. 27, 2017, 5 pages, https://opengear.com/solutions/power-management.

Kleyman, Bill, "Sponsored: Designing Data Center Remote Power Management and Monitoring," Data Knowledge Center, Feb. 22, 2017, 8 pages, http://www.datacenterknowledge.com/archives/2017/02/22/sponsored-designing-data-center-remote-power-management-monitoring.

* cited by examiner

US 10,579,032 B2

POWER DISTRIBUTION UNIT INTERFACE SYSTEM

TECHNICAL FIELD

The examples relate generally to power distribution units (PDUs) that have multiple ports, each of which supplies power to a device connected to the port, and in particular to a PDU interface system that facilitates communications with PDUs of different types.

BACKGROUND

Power distribution units (PDUs) (sometimes referred to as power strips) include electrical ports (sometimes called outlets) that supply power to electrical devices. Some PDUs include network interface circuitry and processing capabilities that allow the PDUs to communicate with other devices over a network. A PDU may respond to commands sent by an external device that direct the PDU to implement certain actions, such as to turn off, turn on, or reboot a particular port. A PDU may also respond to commands sent by an external device that request information from the PDU, such as instantaneous wattage, amperage, or voltage of the PDU, or of one or more ports on the PDU. PDU manufacturers have implemented their own syntaxes for commands, such that syntaxes from different PDU manufacturers differ from one another. Moreover, PDU manufacturers have implemented different communication mechanisms for communicating with PDUs, such that communicating with PDUs from different PDU manufacturers requires different communication mechanisms.

SUMMARY

The examples implement a power distribution unit (PDU) interface system that facilitates communications with PDUs from different manufacturers. The PDU interface system accepts from an initiator an input request for a PDU that has the same syntax irrespective of PDU type. The PDU interface system determines the particular type of the PDU, and then generates a PDU-type input command for the PDU that will implement the request on the PDU. Each PDU-type input command differs depending on the type of PDU. However, the initiator need not be aware of the type of PDU because the input request is the same irrespective of the type of PDU. The examples, among other advantages, greatly simplify communications with PDUs from different manufacturers, reducing cost and time.

In one example a method is provided. The method includes receiving, by a PDU interface system running on a computing device comprising a processor device, from an initiator, an input request associated with a PDU that comprises a plurality of ports, the PDU being a first PDU type of a plurality of PDU types, the input request having a same syntax for each of the PDU types. The method further includes determining that the PDU is the first PDU type of the plurality of PDU types, and, based on the first PDU type, initiating a first PDU-type input command to the PDU. The first PDU-type input command implements the input request on the PDU and has a different syntax than the input request.

In another example a computing device is provided. The computing device includes a memory, and a processor device coupled to the memory. The processor device is to receive, by a PDU interface system running on the processor device, from an initiator, an input request associated with a PDU that comprises a plurality of ports, the PDU being a first PDU type of a plurality of PDU types, the input request having a same syntax for each of the PDU types. The processor device is further to determine that the PDU is the first PDU type of the plurality of PDU types, and, based on the first PDU type, initiate a first PDU-type input command to the PDU. The first PDU-type input command implements the input request on the PDU and has a different syntax than the input request.

In another example a computer program product is provided. The computer program product is stored on a non-transitory computer-readable storage medium and includes instructions to cause a processor device to receive, by a PDU interface system running on the processor device, from an initiator, an input request associated with a PDU that comprises a plurality of ports, the PDU being a first PDU type of a plurality of PDU types, the input request having a same syntax for each of the PDU types. The instructions further cause the processor device to determine that the PDU is the first PDU type of the plurality of PDU types, and, based on the first PDU type, initiate a first PDU-type input command to the PDU. The first PDU-type input command implements the input request on the PDU and has a different syntax than the input request.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
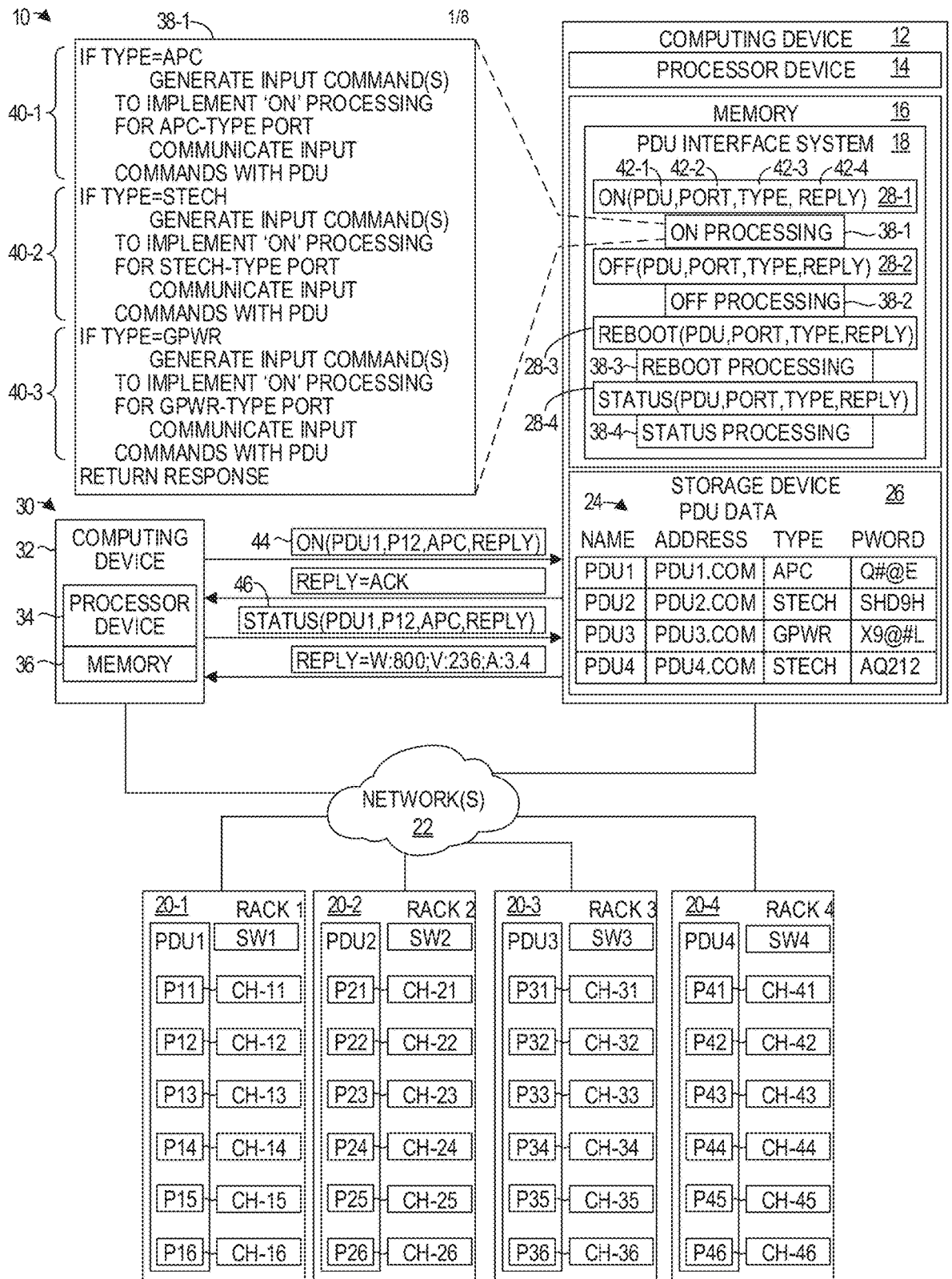
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first PDU type" and "second PDU type," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Power distribution units (PDUs) include electrical ports that supply power to electrical devices. Some PDUs include network interface circuitry and processing capabilities that allow the PDUs to communicate with other devices over a network. A PDU may respond to commands sent by an external device that direct the PDU to implement certain actions, such as to turn off, turn on, or reboot a particular port. A PDU may also respond to commands sent by an external device that request information from the PDU, such as instantaneous wattage, amperage, or voltage of the PDU, or of one or more ports on the PDU. PDU manufacturers have implemented their own syntaxes for commands, such that syntaxes from different PDU manufacturers differ from one another. Moreover, PDU manufacturers have implemented different communication mechanisms for communicating with PDUs, such that communicating with PDUs from different PDU manufacturers requires different communication mechanisms.

Large facilities that have many electrical devices often have PDUs from multiple different manufacturers. By way of non-limiting example, an entity that has hundreds of computing devices, such as a server farm or cloud computing environment, may have a hundred of more PDUs, from many different manufacturers. It may be desirable to obtain information from a PDU for a number of reasons, such as to determine instantaneous voltage, wattage or amperage of one or more ports of the PDU, or total instantaneous voltage, wattage, or amperage of the PDU itself. Some PDUs include temperature and/or humidity sensors, and it may be desirable to remotely determine a current temperature or humidity of the environment that a computing device coupled to a port of a PDU is experiencing.

Unfortunately, due to the differing syntaxes and different communication mechanism for each PDU manufacturer, attempting to obtain information from, or send instructions to PDUs from different manufacturers can be a daunting, complex, and time-consuming task. For example, if an entity has PDUs from five different manufacturers, and each PDU implements ten different commands, a relatively highly skilled programmer must learn fifty different instructions for communicating with the PDUs.

The examples implement a PDU interface system that facilitates communications with PDUs from different manufacturers. The PDU interface system accepts from an initiator an input request for a PDU that has the same syntax irrespective of PDU type. The PDU interface system determines the particular type of the PDU, and then generates a PDU-type input command for the PDU that will implement the request on the PDU. Each PDU-type input command differs depending on the type of PDU. However, the initiator need not be aware of the type of PDU because the input request is the same irrespective of the type of PDU. The examples, among other advantages, greatly simplify communications with PDUs from different manufacturers, reducing cost and time.

The examples have applicability in any number of applications, including, by way of non-limiting example, resource scheduling applications that schedule groups of computing hosts for future use, and monitoring systems that monitor PDUs to detect potential or existing problems.

FIG. 1 is a block diagram of an environment 10 in which examples can be practiced. The environment 10 includes a computing device 12, which includes a processor device 14 and a memory 16. A PDU interface system 18 in the memory 16 executes on the processor device 14. The environment 10 also includes a plurality of racks 20-1-20-4 (generally, racks 20). The rack 20-1 contains six computing hosts, CH-11, CH-12, CH-13, CH-14, CH-15, and CH-16. Computing hosts may be referred to generally herein as a computing host CH, or the computing hosts CH. The rack 20-1 also includes a switch SW1 communicatively coupled to the six computing hosts CH in the rack 20-1 and to a network 22. The rack 20-1 also includes a PDU PDU1 that provides power through ports P11, P12, P13, P14, P15, and P16 to corresponding computing hosts CH-11-CH-16, respectively.

The rack 20-2 contains six computing hosts, CH-21, CH-22, CH-23, CH-24, CH-25, and CH-26, a switch SW2 communicatively coupled to the six computing hosts CH in the rack 20-2, and to the network 22. The rack 20-2 also includes a PDU PDU2 that provides power through ports P21, P22, P23, P24, P25, and P26 to corresponding computing hosts CH-21-CH-26, respectively. The rack 20-3 contains six computing hosts, CH-31, CH-32, CH-33, CH-34, CH-35, and CH-36, a switch SW3 communicatively coupled to the six computing hosts CH in the rack 20-3, and to the network 22. The rack 20-3 also includes a PDU PDU3 that provides power through ports P31, P32, P33, P34, P35, and P36 to corresponding computing hosts CH-31-CH-36, respectively. The rack 20-4 contains six computing hosts, CH-41, CH-42, CH-43, CH-44, CH-45, and CH-46, a switch SW4 communicatively coupled to the six computing hosts CH in the rack 20-4, and to the network 22. The rack 20-4 also includes a PDU PDU4 that provides power through ports P41, P42, P43, P44, P45, and P46 to corresponding computing hosts CH-41-CH-46, respectively.

It should be noted that while the examples disclosed herein are discussed in the context of computing hosts, the examples are not limited to computing hosts, and have applicability in any environment that utilizes PDUs of different types, irrespective of the electrical devices coupled to ports of the PDUs. Moreover, while for purposes of illustration only four racks 20 are illustrated, it should be noted that in practice, the environment 10 could have hundreds or thousands of racks 20, and thousands of computing hosts CH.

Each of the PDUs PDU1-PDU4 is communicatively coupled to the corresponding switch SW in the same rack 20, and is configured to receive input commands to cause the respective PDU to implement certain functionality. For purposes of illustration, it will be assumed that each PDU PDU1-PDU4 can receive commands to: turn on a particular port (i.e., supply power to the port); turn off a particular port (i.e., terminate power to the port); reboot a particular port (i.e., terminate power to the port, and then supply power to the port); return a status of the ports and the PDU which includes power usage information of the ports and the PDU. The phrase "power usage information" as used herein includes one or more of an instantaneous voltage, instantaneous amperage, and instantaneous wattage of a particular port; instantaneous voltage, instantaneous amperage, and instantaneous wattage of all ports; instantaneous voltage, instantaneous amperage, and instantaneous wattage of the PDU; instantaneous temperature sensed by a temperature sensor coupled to the PDU; and instantaneous humidity sensed by a humidity sensor coupled to the PDU.

Each PDU PDU1-PDU4 has a PDU-type attribute. The PDU-type attribute distinguishes between communication protocols to communicate with the respective PDU. While solely for purposes of illustration the PDU-types are distinguished herein based on the respective manufacturers, it should be noted that a single manufacturer could have different PDU types, such as may be used for different model lines of PDUs, or different generations of PDUs.

Certain information about each PDU PDU1-PDU4 is stored in a PDU data structure 24 in a storage device 26. In one example the PDU data structure 24 includes, for each PDU PDU1-PDU4, an identifier of the respective PDU (e.g., PDU1), an address used to communicate with the respective PDU (e.g., a domain name or IP address), a PDU type (e.g., STECH), and authentication information, such as a password or other credentials.

In this example, the PDU interface system 18 implements a plurality of functions 28-1-28-4 (generally, functions 28), each of which can be called or invoked by an initiator 30. In this example the initiator 30 comprises a computing device 32 that includes a processor device 34 and a memory 36. It should be noted that while the PDU data structure 24 is illustrated as being part of the computing device 12, in other examples, the PDU data structure 24 may be on a network-attached drive and accessible to any computing device in the environment 10.

Each function 28-1-28-4 is associated with a particular input request. The function 28-1 is associated with an "on" request and is used by the initiator 30 to turn on a particular port of a PDU. The function 28-2 is associated with an "off" request and is used by the initiator 30 to turn off a particular port of a PDU. The function 28-3 is associated with a "reboot" request and is used by the initiator 30 to turn off a particular port of a PDU and then turn the port on again. The function 28-4 is associated with a "status" request and is used by the initiator 30 to obtain power usage data from a PDU.

The function 28-1 includes instructions 38-1 that include instruction segments 40-1-40-3. The instruction segment 40-1 corresponds to a PDU-type of "APC"; the instruction segment 40-2 corresponds to a PDU-type of "STECH"; and the instruction segment 40-3 corresponds to a PDU-type of "GPWR". The instruction segment 40-1 generates the instructions required by a manufacturer of an APC-type PDU to turn on a port of an APC-type PDU. Such instructions are collectively referred to as an input command. The instructions are typically in a particular syntax identified by the manufacturer, and are communicated to the PDU via a particular communication mechanism, such as via an application programming interface (API) provided by the manufacturer, via simple network management protocol (SNMP), or via a Telnet session with the appropriate PDU. Similarly, the instruction segment 40-2 generates the instructions required by a manufacturer of a STECH-type PDU to turn on a port of a STECH-type PDU. The instructions are typically in a particular syntax identified by the manufacturer that differ from those of an APC-type PDU and a GPWR-type PDU, and are communicated to the PDU via a particular communication mechanism, such as via an API provided by the manufacturer, via SNMP, or via a Telnet session with the appropriate PDU. The instruction segment 40-3 generates the instructions required by a manufacturer of a GPWR-type PDU to turn on a port of a GPWR-type PDU. The instructions are also in a particular syntax identified by the manufacturer that differ from those of an APC-type PDU and a STECH-type PDU, and are communicated to the PDU via a particular communication mechanism, such as via an API provided by the manufacturer, via SNMP, or via a Telnet session with the appropriate PDU.

In a similar manner, the function 28-2 includes instructions 38-2 that include three instruction segments (not illustrated), each of which generates the instructions required by the corresponding manufacturer to turn off a port of a PDU manufactured by the manufacturer. The function 28-3 includes instructions 38-3 that include three instruction segments (not illustrated), each of which generates the instructions required by the corresponding manufacturer to reboot a port of a PDU manufactured by the manufacturer. The function 28-4 includes instructions 38-4 that include three instruction segments (not illustrated), each of which generates the instructions required by the corresponding manufacturer to request power usage information from a PDU manufactured by the manufacturer.

In one example, the function 28-1 includes four arguments 42-1-42-4. A PDU argument 42-1 identifies the PDU associated with the request. A port argument 42-2 identifies a particular port of the PDU associated with the request. A PDU-type argument 42-3 identifies a particular PDU-type of the PDU associated with the request. A reply argument 42-4 contains the information received by the PDU interface system 18 after initiating the input command to the PDU.

As an example, the initiator 30 may send an input request 44 to the PDU interface system 18 that requests the PDU interface system 18 to turn on the port P12 of the PDU PDU1. In this example, the input request 44 takes the form of an invocation of the function 28-1 that identifies the PDU PDU1 in the PDU argument 42-1, port P12 in the port argument 42-2, and APC in the PDU-type argument 42-3. The initiator 30 may know the PDU type of the PDU PDU1 based on information such as the PDU data structure 24.

The function 28-1 performs the instruction segment 40-1 to initiate an input command to the PDU PDU1 directing the PDU PDU1 to supply power to the port P12. The PDU PDU1 returns an acknowledgement (ACK) to the function 28-1. The function 28-1 places the acknowledgment in the reply argument 42-4, which is returned to the initiator 30. The initiator 30 may next send an input request 46 to the PDU interface system 18 that requests the PDU interface system 18 to obtain power usage data of the port P12 of the PDU1. In this example, the input request 46 takes the form of an invocation of the function 28-4 that identifies the PDU PDU1 in the PDU argument 42-1, port P12 in the port argument 42-2, and APC in the PDU-type argument 42-3. By convention, if the port argument 42-2 is empty, the input request may be interpreted to be a request for the power usage data of each port of the PDU PDU1, and of the PDU1 itself, including temperature and humidity. The function 28-4 performs the status processing implemented by the instructions 38-4 to initiate an input command to the PDU PDU1 directing the PDU PDU1 to return the power usage data associated with the port P1. The PDU PDU1 returns the power usage data to the function 28-1. The function 28-1 places the power usage data in the reply argument 42-4, which is returned to the initiator 30.

Note that the syntax and communication mechanisms of the input requests by the initiator 30 do not change irrespective of the type of PDU, thus shielding the details of communicating with different types of PDUs from the initiator 30. Moreover, the PDU interface system 18, in some circumstances, may implement functionality not offered by one PDU manufacturer to match the functionality offered by other PDU manufacturers. For example, if a PDU manufacturer does not offer a reboot functionality, the instructions 38-3 may, for PDUs of that particular type, call the function 28-2 to turn off the port, wait a predetermined amount of time, and then call the function 28-1 to turn on the port. This is transparent, however, to the initiator 30 which simply invokes the function 28-3 and is unaware that PDUs of the particular PDU type do not offer reboot functionality.

Similarly, assume that a PDU manufacturer does not implement a function that returns the power usage data of all the ports, and instead, each port must be individually requested. The PDU interface system 18 may offer a function that, when invoked by the initiator 30, individually requests the power usage data for each port of the PDU, concatenates the power usage data of each port into a single variable, and sends the power usage data of each port back to the initiator 30.

It should be noted that because the PDU interface system 18 is a component of the computing device 12, functionality implemented by the PDU interface system 18 may be attributed to the computing device 12 herein. Moreover, in examples where the PDU interface system 18 comprises software instructions that program the processor device 14 to carry out functionality discussed herein, functionality implemented by the PDU interface system 18 may be attributed herein to the processor device 14.

Figure 2:
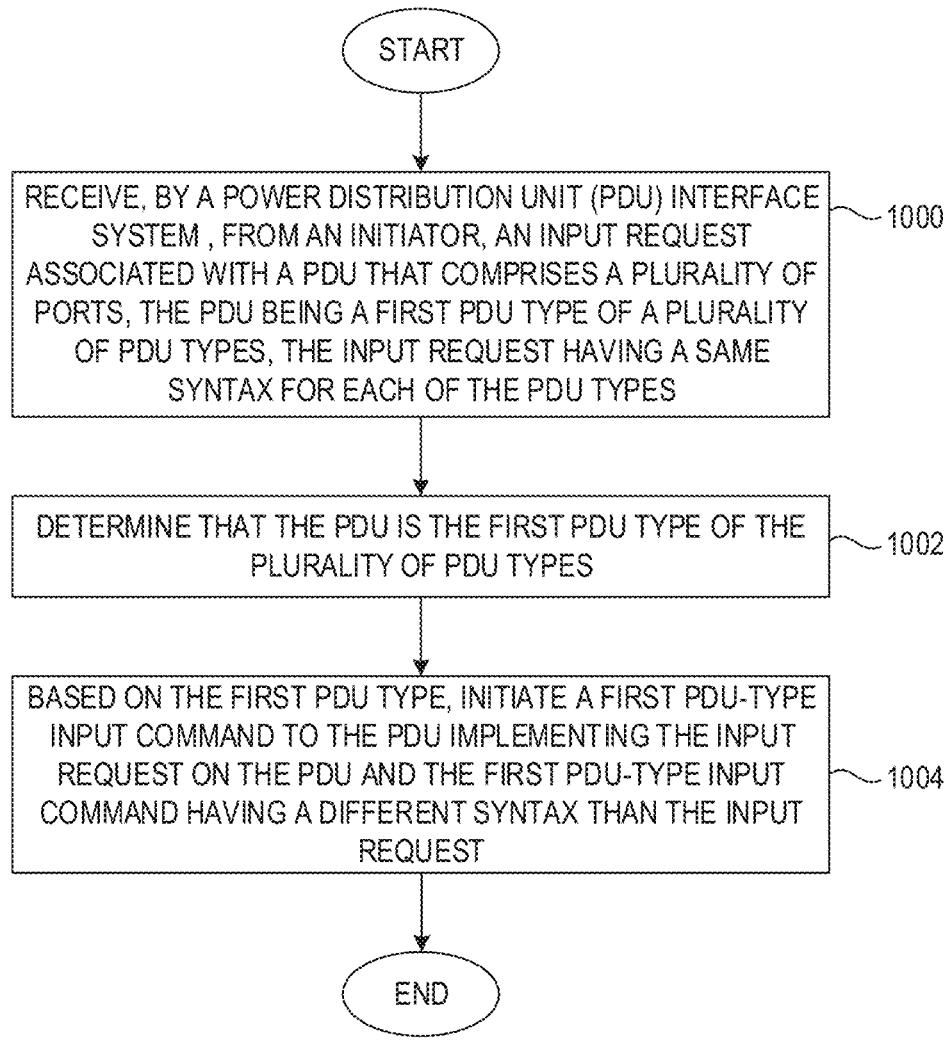
FIG. 2 is a flowchart of a method for interfacing with a plurality of different PDU types according to one example.

FIG. 2 is a flowchart of a method for interfacing with a plurality of different PDU types according to one example. FIG. 2 will be discussed in conjunction with FIG. 1. The PDU interface system 18 receives, from the initiator 30, the input request 44 associated with the PDU PDU1. The input request 44 has a same syntax for each of the different PDU types (FIG. 2, block 1000). The PDU interface system 18 determines that the PDU PDU1 is a APC PDU type (FIG. 2, block 1002). In this example, the PDU interface system 18 determines that the PDU PDU1 is an APC PDU type based on the PDU-type argument 42-3. In other examples, the PDU interface system 18 determines that the PDU PDU1 is an APC PDU type by, for example, accessing the PDU data structure 24. Based on the PDU type, the PDU interface system 18 initiates a APC-type input command to the PDU DPU1 that implements the input request on the PDU PDU1, the APC-type input command having a different syntax than the input request 44 (FIG. 2, block 1004).

Figure 3:
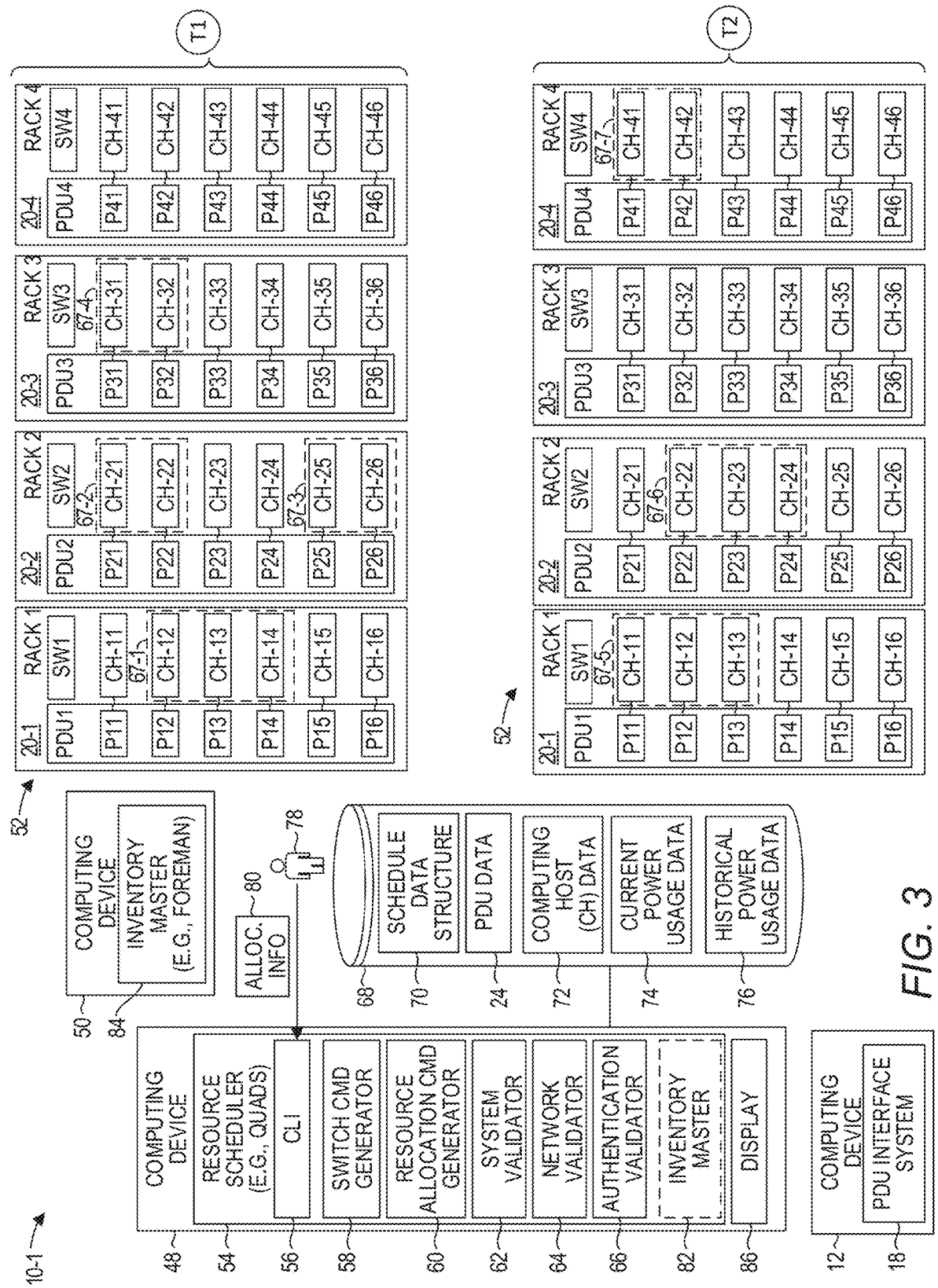
FIG. 3 is a block diagram of an environment in which additional examples disclosed herein may be practiced.

FIG. 3 is a block diagram of an environment 10-1 in which additional examples disclosed herein may be practiced. In particular, the environment 10-1 includes the PDU interface system 18 in the context of a resource scheduling environment. The environment 10-1 includes a computing device 48, a computing device 50, and a pool 52 of a plurality of computing resources, including the plurality of computing hosts CH and the one or more switches SW1-SW4. For purposes of brevity, the switches SW1-SW4 may be referred to generally or collectively as the switches SW. The pool 52 of computing resources, which includes computing hosts CH and switches SW, can be programmatically configured to implement local area networks (LANs), including virtual local area networks (VLANs). In some examples, each switch SW may be communicatively connected to each other switch SW, and may be directly connected to the computing hosts CH that are in the same rack as the respective switch SW.

While for purposes of illustration and relative simplicity only twenty-four computing hosts CH are illustrated, the examples have applicability to pools of any number of computing hosts CH, such as hundreds or thousands of computing hosts CH. In the present examples, each computing host CH is a separate physical "bare machine," but the examples are not limited to bare machine computing resources.

The computing device 48 includes a resource scheduler 54 according to one example. As will be discussed in detail herein, the resource scheduler 54 allows for the scheduling of and subsequent automated generation of test environments of computing resources from the pool 52 of computing resources to facilitate testing of, for example, software products. In some examples, the resource scheduler 54 may be based on the quick and dirty scheduler (QUADS) available at github.com/redhat-performance/quads, with the additional functionality discussed herein.

Solely for purposes of illustration, the resource scheduler 54 will be discussed herein in terms of functional processes, including, for example, a command line interface (CLI) 56, a switch command generator 58, a resource allocation command generator 60, a system validator 62, a network validator 64, and an authentication validator 66. However, these functional processes are illustrated merely for discussing the overall functionality of the resource scheduler 54, and it will be apparent that the functionality discussed herein could be implemented in any number of functional processes and that the examples are not limited to the particular functional processes discussed herein.

Additionally, because the resource scheduler 54 is a component of the computing device 48, functionality implemented by the resource scheduler 54 may be attributed herein to the computing device 48 generally. Moreover, in examples where the resource scheduler 54 comprises software instructions that program a processor device to carry out functionality discussed herein, functionality implemented by the resource scheduler 54 may be attributed herein to such processor device.

The pool 52 of computing resources is illustrated in FIG. 3 at two different points in time, a time T1 and a time T2. At the time T1, the pool 52 of computing resources includes four test environments 67-1, 67-2, 67-3 and 67-4 (generally, test environments 67). Each test environment 67 includes one or more computing hosts CH, and associated networking resources from one or more of the switches SW. At the subsequent point in time T2, the pool 52 of computing resources includes three test environments 67-5, 67-6, and 67-7.

A storage device 68 maintains a schedule data structure 70 that identifies how the pool 52 will be configured at any given time. The storage device 68 also includes the PDU data structure 24 and computing host (CH) data 72 which correlates each computing host CH with the PDU and the port from which the computing host CH obtains electrical power. Note that while each computing host CH is shown as obtaining power from a single port, in practice, it is common for each computing host CH to be coupled to multiple ports for redundancy purposes, and in such situations, the CH data 72 identifies each port and each PDU to which the computing host CH is coupled. In this example, the resource controller 54 serves as an initiator to the PDU interface system 18 and intermittently, or periodically, generates a plurality of input requests that request power usage data associated with the plurality of PDUs PDU1-PDU4, and sends the input requests to the PDU interface system 18. The PDU interface system 18 receives the plurality of input requests and initiates corresponding PDU-type input commands to the plurality of PDUs PDU1-PDU4, as discussed above with regard to FIGS. 1 and 2. The PDU interface system 18 receives, from the plurality of PDUs PDU1-PDU4, power usage data that corresponds to each PDU, and sends, to the resource scheduler 54, the power usage data that corresponds to each PDU. The resource scheduler 54 stores the power usage data as current power usage data 74. The resource scheduler 54 also stores the power usage data along with previously obtained power usage data in historical power usage data 76, which comprises power usage data of the PDUs PDU1-PDU4 over a period of time, such as minutes, hours, days, weeks, months, and/or years.

The resource scheduler 54 maintains the schedule data structure 70, automatically monitors the schedule data structure 70, and at the times identified in the schedule data structure 70, causes the computing resources in the pool 52 of computing resources to be configured to generate new test environments 67 in accordance with the schedule data structure 70. The monitoring of the schedule data structure 70 and configuration of the new test environments 67 occurs automatically, greatly reducing the amount of personnel needed to maintain the pool 52 of computing resources. Automatic generation of the test environments 67 also ensures that individuals awaiting the creation of a test environment 67 will be provided the test environment 67 at the time the test environment 67 was scheduled to be created, and also ensures that employees who are currently utilizing the test environments 67 do not utilize the test environments 67 longer than scheduled.

Details of the resource scheduler 54 according to some examples will now be discussed. A user, such as an operator 78, utilizes the CLI 56 to input allocation information 80 to the resource scheduler 54. The allocation information 80 identifies a future configuration state of one or more of the computing resources in the pool 52 of computing resources to form a new network. For example, the allocation information 80 may identify a particular computing host CH, a name of the test environment 67 to which the particular computing host CH will be assigned, an assignment start time, such as a time and date that the test environment 67 is to be automatically generated, and an assignment end time, such as a time and date that the test environment 67 will terminate. The allocation information 80 may also identify VLANs that should be generated for the test environment 67, user identifiers and passwords that are to be generated to limit access to the test environment 67, and any other relevant information associated with the test environment 67. Allocation information 80 may also include one or more of the following: credentials of the switches SW, media access control (MAC) addresses of physical host network interfaces, identifiers of the physical switch ports to which the MAC addresses are connected, a name of each computing host CH, MAC addresses of the provisioning interface of each computing host CH, a network of each computing host CH, a subnet of each computing host CH, and a desired operating system to be loaded onto each computing host CH.

In some examples, the resource scheduler 54 accesses the CH data 72 data that correlates each computing host CH with the port to which it is connected, and based on the current power usage data 74, identifies a subset of computing hosts CH to form the new network, and presents the subset of computing hosts CH to the operator 78, or automatically overrides computing hosts CH identified by the operator 78. In some examples the operator 78 may merely identify a number of computing hosts CH, and the resource scheduler 54 automatically, based in part on the current power usage data 74 and/or the historical power usage data 76, identifies the subset of computing hosts CH for the new network. For example, the resource scheduler 54 may determine, based on high temperatures identified in the current power usage data 74, that certain computing hosts CH should not be used, or, the resource scheduler 54 may determine, based on low temperatures identified in the current power usage data 74, that certain computing hosts CH should be used in the new network. Similarly the resource scheduler 54 may determine, based on voltage, wattage, or amperage, that certain computing hosts CH should, or should not, be used in the new network.

In one example, certain application workloads are categorized into low, medium, and high power requirements, and are mapped to that application workload. Wattage, voltage, and amperage values are obtained from the PDUs over time. Thresholds are then developed to categorize existing power usage data that can identify the ideal location to place a certain workload to better distribute power, and/or when a machine, a set of machines, or a set of workloads to an area that is not as utilized. In some examples it can be determined whether entire racks can be vacated and can consolidate the same workloads on other systems so that parts of the infrastructure can be powered off to lower a carbon footprint and save power.

The resource scheduler 54 may perform certain validations, such as to ensure that the identified computing host CH is available over the requested designated time period. The resource scheduler 54 then stores the information in the schedule data structure 70 in association with the particular computing host CH. The allocation information 80 may identify multiple computing hosts CH to be assigned to the test environment 67, or the operator 78 may enter multiple instances of allocation information 80, each corresponding to a particular computing host CH.

The resource scheduler 54 continually monitors the schedule data structure 70 to determine if the current point in time matches any time identified in the schedule data structure 70. The resource scheduler 54 may monitor the schedule data structure 70 periodically, such as every minute, every five minutes, every ten minutes, or any other desirable period.

Upon determining that a time identified in the schedule data structure 70 has arrived, the resource scheduler 54 causes the computing host(s) CH to be configured from their current configuration state to the configuration state identified in the schedule data structure 70. The resource scheduler 54 may cause the configuration in a number of different ways. In one example, the resource scheduler 54 includes an inventory master 82 which maintains the pool 52 of computing resources. The inventory master 82 may, for example, be capable of implementing desired operating systems on the computing hosts CH, implementing user identifier and password security, and the like. In such examples, the resource scheduler 54 causes the configuration of the computing hosts CH via the integrated inventory master 82, which communicates a plurality of commands to the computing hosts CH and the switches SW to implement the desired configuration states and thereby generate the scheduled test environment 67.

In another example, the resource scheduler 54 sends a command to an external inventory master 84 that is responsible for configuring the computing resources in the pool 52 of computing resources in response to commands from the resource scheduler 54. In one example, the external inventory master 84 comprises the Foreman lifecycle management tool, available at www.theforeman.org; however, the examples are not limited to any particular external inventory master 84. The resource scheduler 54 may communicate the commands to the inventory master 84 via any suitable interprogram communication mechanism, such as via an API, or the like. Commands that the inventory master 84 may be directed to do include removing a prior host "role" of the respective computing host CH, adding a current "role" that corresponds to the right user views/permissions for the current test environment 67, and changing cloud users. Commands may direct the inventory master 84 to provision a computing host CH with a particular operating system, and install on the computing host CH a particular network configuration.

For purposes of illustration, the resource scheduler 54 will be illustrated in conjunction with the external inventory master 84 rather than the inventory master 82. Based on the network information provided in the allocation information 80, the switch command generator 58 sends commands to one or more of the switches SW to programmatically set up the appropriate switch ports with the appropriate computing hosts CH. This may involve setting up VLANS among the appropriate computing hosts CH. Based on the information in the schedule data structure 70, the resource allocation command generator 60 generates a plurality of commands that direct the inventory master 84 to configure the relevant computing hosts CH in the pool 52 of computing resources.

The system validator 62 validates that the inventory master 84 has in fact configured the computing hosts CH in accordance with the commands. In one example where the inventory master 84 is the Foreman lifecycle management tool, the system validator 62 requests, from the inventory master 84, a build state of the respective computing host CH. If the inventory master 84 identifies the build state as being false, the system validator 62 identifies the respective computing host CH as being properly configured. If the inventory master 84 identifies the build state as being true, the system validator 62 identifies the respective computing host CH as being in the process of being configured.

The network validator 64 ensures that the network interfaces associated with the computing hosts CH in the test environment 67 have been properly configured with the allocated IP addresses for the computing hosts CH. In one example, the network validator 64 sends a ping command to each allocated internet protocol (IP) address associated with the test environment 67. If the network validator 64 receives a response to the ping command, the network validator 64 determines that the allocated IP address has been properly set up. If the network validator 64 does not receive a response to the ping command, the network validator 64 may, for example, generate and present an alert to the operator 78 on a display 86 indicating that the allocated IP address has not been properly configured in the computing host CH.

The authentication validator 66 ensures that designated user identifiers and passwords have been generated to limit access to the computing hosts CH in the new test environment 67. In one example, the authentication validator 66 sends a series of commands to a computing host CH in the test environment 67, each command using a designated user identifier and password. If the respective command associated with a particular user identifier and password is successfully processed by the computing host CH, the authentication validator 66 determines that the particular user identifier and password have been properly configured to limit access. If the respective command associated with a particular user identifier and password is not successfully processed by the computing host CH, the authentication validator 66 may, for example, generate and present an alert to the operator 78 on the display 86 indicating that the particular user identifier and password have not been properly configured.

Figure 4:
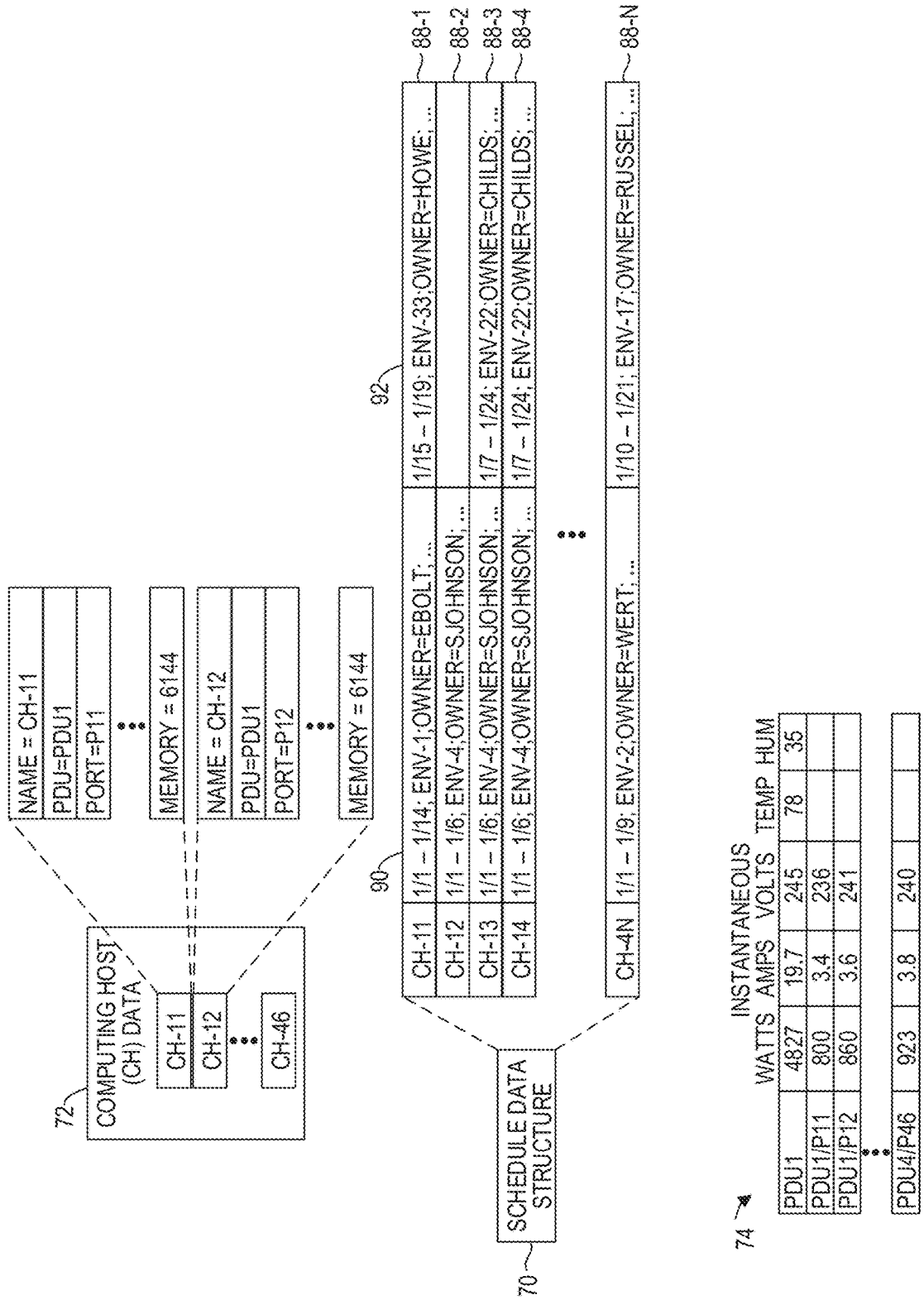
FIG. 4 is a block diagram illustrating in greater detail several of the data structures discussed above with regard to FIG. 3.

FIG. 4 is a block diagram illustrating in greater detail several of the data structures discussed above with regard to FIG. 3. The CH data 72 correlates each computing host CH with the PDU and the port from which the computing host CH obtains electrical power. The current power usage data 74 contains, for each PDU, temperature data that identifies an instantaneous temperature sensed by the PDU, humidity data that identifies an instantaneous humidity sensed by the PDU, and aggregate wattage, amps, and volts of the PDU. For each port, the current power usage data 74 contains instantaneous wattage, amperage, and/or voltage for the port.

The example schedule data structure 70 includes an entry 88 for each computing host CH in the pool 52 of computing resources. Solely for purposes of illustration, only four entries 88-1-88-N, which correspond respectively to computing hosts CH-11, CH-13, CH-14, and CH-46, are shown. The entries 88-1-88-N are illustrative only, and may not be consistent with test environments 67 illustrating the computing hosts CH-11, CH-13, CH-14, and CH-46 in other figures herein. The entry 88-1 contains a test environment record 90 that indicates that the computing host CH-11, on January 1, is to be configured to be part of a test environment 67 called "ENV-1" that is associated with an owner named "EBOLT."

The entry 88-1 also contains a test environment record 92 that indicates the computing host CH-11, on January 15, is to be configured to be part of a test environment 67 called "ENV-33" that is associated with an owner named "HOWE." Thus, on January 15, the resource scheduler 54 will automatically detect that the computing host CH-11 is to be configured from a current configuration state to the configuration state identified in the test environment record 92, and perform the processing, as discussed above with regard to FIG. 3, to cause the computing host CH-11 to be configured to such configuration state, without human involvement or input. While only two test environment records 90, 92 are illustrated, it should be apparent that any number of test environment records 90, 92 may be associated with the computing host CH-11.

Each entry 88 may include additional configuration information, such as, by way of non-limiting example, the current test environment 67 to which the computing host CH belongs, network interfaces on the computing host CH, and a default test environment 67 to which the computing host CH is assigned if not otherwise assigned to a particular test environment 67.

The schedule data structure 70 may also include an entry for each test environment 67. Each such entry may include, for example, a name of the test environment 67, a creation time of the test environment 67, identifiers of users who receive notifications, a description of the test environment 67, an owner of the test environment 67, a particular VLAN design of the test environment 67, and a ticket number associated with the creation of the test environment 67.

Figure 5:
FIG. 5 is a block diagram of a heat map image generated based on current power usage data according to one example.

FIG. 5 is a block diagram of a heat map image 94 generated based on the current power usage data according to one example. In particular, in one example, the resource scheduler 54 accesses the current power usage data 74, accesses the CH data 72, and generates the heat map image 94 that quantifies relative temperatures of the plurality of computing hosts CH to one another. The resource scheduler 54 may present the heat map image 94 on the display 86, for example, to visually depict to the operator 78 temperature ranges of the computing hosts CH.

Figure 6:
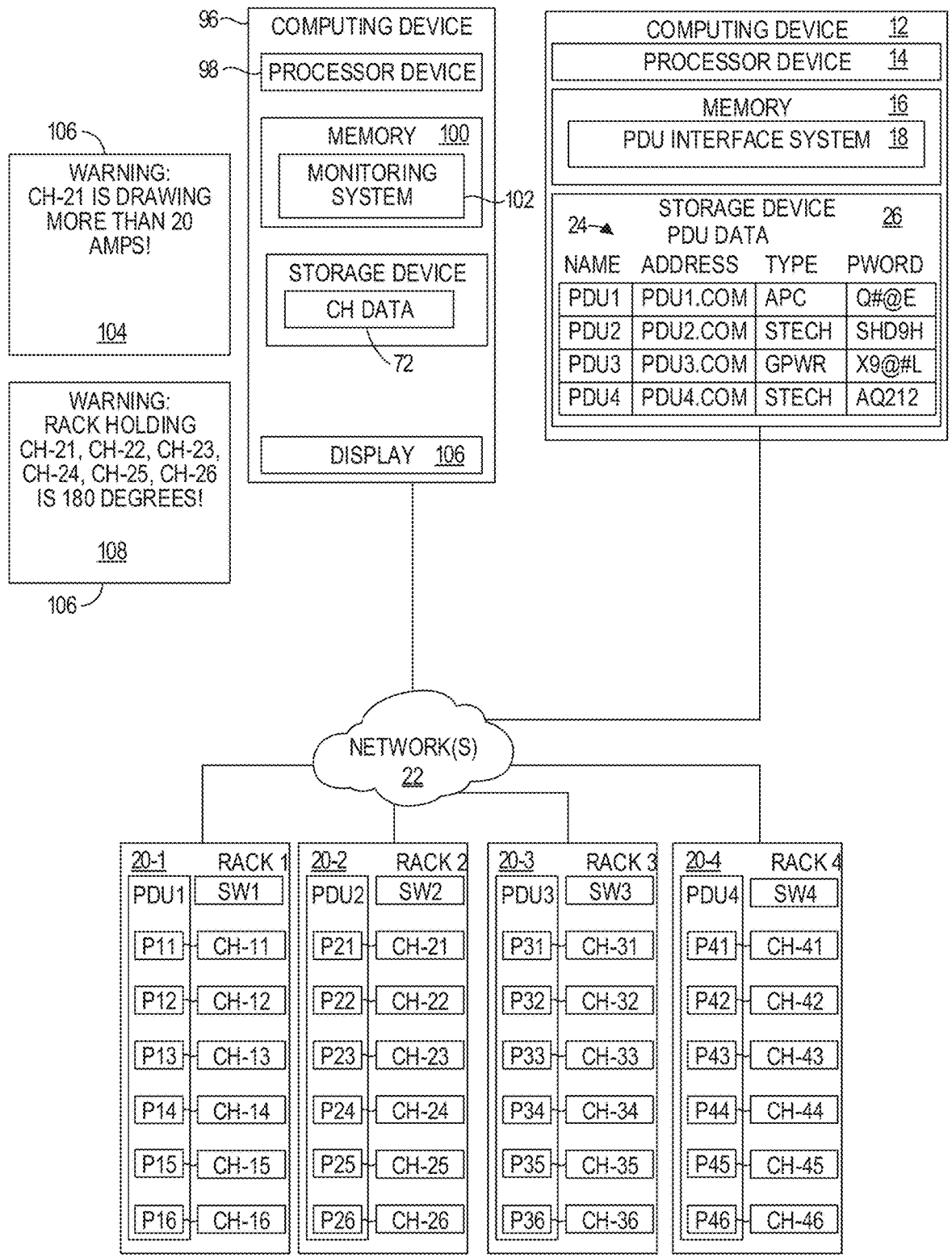
FIG. 6 is a block diagram of an environment in which additional examples disclosed herein may be practiced.

FIG. 6 is a block diagram of an environment 10-2 in which additional examples disclosed herein may be practiced. In particular, the environment 10-2 includes the PDU interface system 18 in the context of a monitoring system. The environment 10-2 includes a computing device 96 that includes a processor device 98 and a memory 100. A monitoring system 102 serves as an initiator in this example. The monitoring system 102 has access to the CH data 72 that correlates each computing host CH to a PDU and a port. The monitoring system 102 intermittently, or periodically, generates a plurality of input requests that request power usage data associated with the plurality of PDUs PDU1-PDU4, and sends the input requests to the PDU interface system 18. The PDU interface system 18 receives the plurality of input requests and initiates corresponding PDU-type input commands to the plurality of PDUs PDU1-PDU4, as discussed above with regard to FIGS. 1 and 2. The PDU interface system 18 receives, from the plurality of PDUs PDU1-PDU4, power usage data that corresponds to each PDU, and sends, to the monitoring system 102, the power usage data that corresponds to each PDU. The power usage data comprises data values that identify one or more of instantaneous voltage of each port of the plurality of ports of the plurality of PDUs PDU1-PDU4, instantaneous wattage of each port of the plurality of ports of the plurality of PDUs PDU1-PDU4, or instantaneous amperage of each port of the plurality of ports of the plurality of PDUs PDU1-PDU4.

The monitoring system 102 determines that one of the data values exceeds a predetermined threshold, and accesses the CH data 72 that correlates each computing host CH to a port of the plurality of ports of the plurality of PDUs PDU1-PDU4. The monitoring system 102 determines that the one of the data values corresponds to a particular computing host CH, and sends a warning message 104 to, for example, a display 106 identifying the particular computing host CH.

In another example, the monitoring system 102 receives power usage data that corresponds to each PDU PDU1-PDU4. The power usage data includes data values that identify one or more of instantaneous temperature associated with each PDU of the plurality of PDUs and instantaneous humidity associated with each PDU of the plurality of PDUs. The monitoring system 102 determines that one of the data values corresponds to one of the PDUs and exceeds a predetermined threshold. The monitoring system 102 accesses the CH data 72 that correlates each computing host CH to a corresponding PDU, and identifies, based on the power usage data, a subset of computing hosts CH that receive power from the one of the PDUs. The monitoring system 102 sends a warning message 108 to, for example, the display 106 identifying the subset of computing hosts CH.

Figure 7:
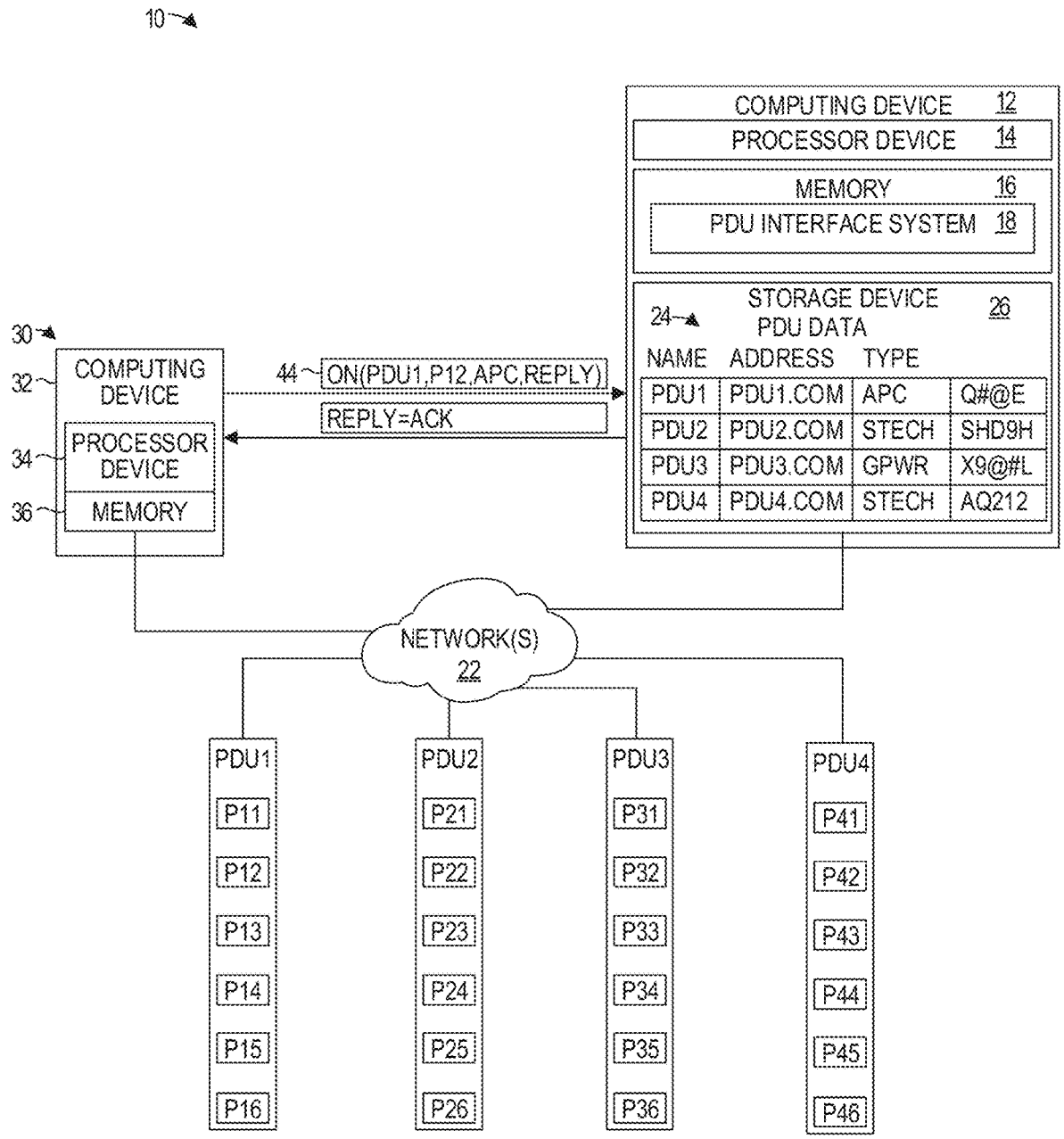
FIG. 7 is a simplified block diagram of the environment illustrated in FIG. 1 according to one example.

FIG. 7 is a simplified block diagram of the environment 10 illustrated in FIG. 1 according to one example. In this example, the computing device 12 includes the memory 16 and the processor device 14 coupled to the memory 16. The processor device 14 is to receive, by the PDU interface system 18 running on the processor device 14, from the initiator 30, the input request 44 associated with a power distribution unit (PDU) that comprises a plurality of ports. The PDU is a first PDU type of a plurality of different PDU types, and the input request 44 has a same syntax for each of the different PDU types. The processor device 14 is further to determine that the PDU is the first PDU type of the plurality of PDU types, and based on the first PDU type, initiate a first PDU-type input command to the PDU that implements the input request 44 on the PDU, the first PDU-type input command having a different syntax than the input request 44.

Figure 8:
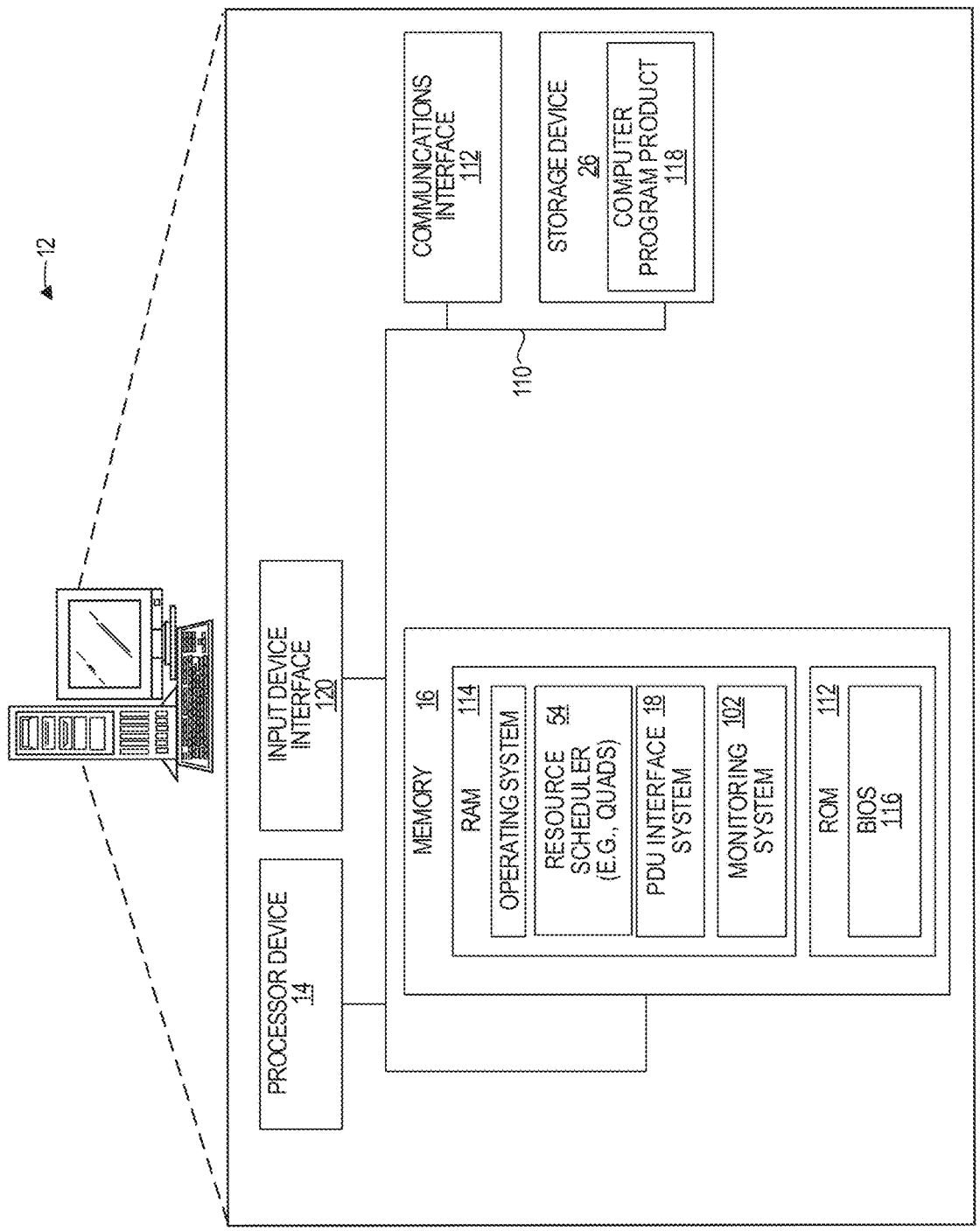
FIG. 8 is a block diagram of a computing device suitable for implementing examples disclosed herein.

FIG. 8 is a block diagram of the computing device 12 suitable for implementing examples according to one example. However, the hardware discussed herein for the computing device 12 is also suitable for implementing the functionality discussed, for example, by the monitoring system 102 and the resource scheduler 54. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the memory 16, and a system bus 110. The system bus 110 provides an interface for system components including, but not limited to, the memory 16 and the processor device 14. The processor device 14 can be any commercially available or proprietary processor.

The system bus 110 may be any of several types of bus structures that may further interconnect to a memory bus (with or without a memory controller), a peripheral bus, and/or a local bus using any of a variety of commercially available bus architectures. The memory 16 may include non-volatile memory 112 (e.g., read-only memory (ROM), erasable programmable read-only memory (EPROM), electrically erasable programmable read-only memory (EEPROM), etc.), and volatile memory 114 (e.g., random-access memory (RAM)). A basic input/output system (BIOS) 116 may be stored in the non-volatile memory 112 and can include the basic routines that help to transfer information between elements within the computing device 12. The volatile memory 114 may also include a high-speed RAM, such as static RAM, for caching data.

The computing device 12 may further include or be coupled to a non-transitory computer-readable storage medium such as the storage device 26, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 26 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 26 and in the volatile memory 114, including an operating system and one or more program modules, such as the PDU interface system 18, the resource scheduler 54, and/or the monitoring system 102 which may implement the functionality described herein in whole or in part.

All or a portion of the examples may be implemented as a computer program product 118 stored on a transitory or non-transitory computer-usable or computer-readable storage medium, such as the storage device 26, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14.

The processor device 14, in conjunction with the PDU interface system 18, the resource scheduler 54, and/or the monitoring system 102 in the volatile memory 114, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 120 that is coupled to the system bus 110 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 122 suitable for communicating with a network as appropriate or desired.

The examples have broad applicability to many different applications. For example, the power distribution unit interface system disclosed herein may utilize the historical power usage data 76 to map common workloads so such common workloads can be assigned a value or "power weight" to a certain workload. This encompasses both average power usage as well as net increase in temperature typical with such workload. This may be utilized by the resource scheduler 54 to determine the most ideal computing hosts CH to place certain workloads.

In some examples, the resource scheduler 54 can more evenly distribute power draw and temperatures programmatically by making intelligent decisions based on data gathered from the PDUs.

In some examples, the resource scheduler 54 can use the historical power usage data 76 to determine historical trending of power and temperature readings over time, across the racks 20 and across different workloads that are taken on. Visual representations of such trends inside external data sources such as Elasticsearch may help identify "hot" areas before they become a problem.

In some examples, the resource scheduler 54 can reallocate workloads on-the-fly based on overutilization or underutilization.

In some examples, the resource scheduler 54 can, based on the power usage data, decide to take a computing host CH out of the pool 52 of computing resources.

As another use case, assume that a datacenter manager in a large co-location facility for a corporation deployed the resource scheduler 54 on some relatively high-powered servers but noticed their kilowatt hours are still very high, even though the team only runs computing jobs during the week. The manager developed a program to interface with the PDU interface system 18 to shut down computing hosts CH over the weekend and power them back up on Monday morning. This resulted in a decrease in the kilowatt hour charges for electricity usage.

In another example, a program was written to interface with the PDU interface system 18 in order to obtain power usage data and in order to implement an automated deployment plan to only utilize idle servers for their workloads, powering off machines that were under a certain usage threshold after a certain amount of time and combining workloads into smaller sets of machines when possible. To make full use of this program, an in-house application was modified to be able to switch between computing hosts CH as needed.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a power distribution unit (PDU) interface system running on a computing device comprising a processor device, from a resource scheduler, a plurality of input requests that corresponds to a plurality of PDUs, each PDU comprising a respective plurality of ports, and, the input requests requesting power usage data associated with the plurality of PDUs, wherein each input request is associated with a corresponding PDU, the corresponding PDU being a particular PDU type of a plurality of PDU types, each input request having a same syntax for each of the PDU types;
   determining, for each corresponding PDU, that the corresponding PDU is the particular PDU type of the plurality of PDU types;
   for each corresponding PDU, based on the particular PDU type, initiating a PDU-type input command to the corresponding PDU, the PDU-type input command implementing the input request on the corresponding PDU and having a different syntax than the input request;
   receiving, from the plurality of PDUs, power usage data that corresponds to each PDU;
   sending, to the resource scheduler, the power usage data that corresponds to each PDU;
   receiving, by the resource scheduler, the power usage data that corresponds to each PDU;
   accessing data that correlates each computing host of a plurality of computing hosts to a particular port of the plurality of ports of the plurality of PDUs; and
   based on the power usage data, identifying a subset of computing hosts of the plurality of computing hosts to form a network of computing hosts.

2. The method of claim 1 wherein determining, for each corresponding PDU, that the corresponding PDU is the particular PDU type of the plurality of PDU types comprises:
   extracting, from each input request, a PDU identifier; and
   accessing a data structure that correlates a plurality of PDU identifiers to the plurality of PDU types.

3. The method of claim 1 wherein:
   at least one input request comprises an input request associated with a particular port of the plurality of ports of the PDU; and
   the at least one input request identifies the particular port.

4. The method of claim 1 wherein the power usage data comprises temperature data that identifies an instantaneous temperature sensed by each PDU, and wherein identifying the subset of computing hosts of the plurality of computing hosts to form the network of computing hosts comprises identifying the subset of computing hosts of the plurality of computing hosts to form the network of computing hosts based on the temperature data.

5. The method of claim 1 further comprising:
   initiating a plurality of configuration commands to each computing host in the subset of computing hosts and to a plurality of corresponding switches to which ones of the subset of computing hosts are connected to form the network of computing hosts.

6. A computing system, comprising:
   one or more memories; and one or more processor devices coupled to the one or more memories to:
receive, by a power distribution unit (PDU) interface system, from a monitoring system, a plurality of input requests that corresponds to a plurality of PDUs, each PDU comprising a respective plurality of ports, and, the input requests requesting power usage data associated with the plurality of PDUs, wherein each input request is associated with a corresponding PDU, the corresponding PDU being a first particular PDU type of a plurality of PDU types, each input request having a same syntax for each of the PDU types;
determine, for each corresponding PDU, that the corresponding PDU is the particular PDU type of the plurality of PDU types;
for each corresponding PDU, based on the particular PDU type, initiate a PDU-type input command to the corresponding PDU, the PDU-type input command implementing the input request on the corresponding PDU and having a different syntax than the input request;
receive, from the plurality of PDUs, power usage data that corresponds to each PDU;
send, to the monitoring system, the power usage data that corresponds to each PDU;
receive, by the monitoring system, the power usage data that corresponds to each PDU, the power usage data comprising data values that identify one or more of:
instantaneous voltage of each port of the plurality of ports of the plurality of PDUs;
instantaneous wattage of each port of the plurality of ports of the plurality of PDUs; and
instantaneous amperage of each port of the plurality of ports of the plurality of PDUs;
determine that one of the data values exceeds a predetermined threshold;
access data that correlates each computing host of a plurality of computing hosts to a particular port of the plurality of ports of the plurality of PDUs;
determine that the one of the data values corresponds to a particular computing host; and
send a warning message identifying the particular computing host.

7. A computer program product stored on a non-transitory computer-readable storage medium and including instructions to cause a processor device to:
access, by a resource scheduler, data that correlates each computing host of a plurality of computing hosts to a particular port of a plurality of ports of a plurality of power distribution units (PDUs);
generate historical power usage data for each computing host of the plurality of computing hosts by iteratively, over a period of time:
sending to a PDU interface system a plurality of input requests that correspond to the plurality of PDUs, the input requests requesting power usage data associated with the plurality of PDUs, each input request associated with a corresponding PDU of the plurality of PDUs, the corresponding PDU being a particular PDU type of a plurality of PDU types, each input request having a same syntax for each of the PDU types;
receiving, by the PDU interface system, from the resource scheduler, the plurality of input requests;
determining, for each input request the particular PDU type of the corresponding PDU
for each input request, based on the particular PDU type, initiating a PDU-type input command to the corresponding PDU, the PDU-type input command implementing the input request on the corresponding PDU and having a different syntax than the input request;
receiving, from the plurality of PDUs, power usage data that corresponds to each PDU;
sending, to the resource scheduler, the power usage data that corresponds to each PDU;
receiving, by the resource scheduler, the power usage data that corresponds to each PDU; and
storing the power usage data that corresponds to each PDU;
based on a schedule data structure, determine that a subset of computing hosts is to be configured from a current configuration state to a subsequent configuration state identified in the schedule data structure to form a new network of computing hosts; and
select the subset of computing hosts based on the historical power usage data.

8. A method comprising:
receiving, by a power distribution unit (PDU) interface system running on a computing device comprising a processor device, from a resource scheduler, a plurality of input requests that corresponds to a plurality of PDUs, each PDU comprising a respective plurality of ports, and, the input requests requesting power usage data associated with the plurality of PDUs, wherein each input request is associated with a corresponding PDU, the corresponding PDU being a particular PDU type of a plurality of PDU types, each input request having a same syntax for each of the PDU types;
determining, for each corresponding PDU, that the corresponding PDU is the particular PDU type of the plurality of PDU types;
for each corresponding PDU, based on the particular PDU type, initiating a PDU-type input command to the corresponding PDU, the PDU-type input command implementing the input request on the corresponding PDU and having a different syntax than the input request;
receiving, from the plurality of PDUs, power usage data that corresponds to each PDU;
sending, to the resource scheduler, the power usage data that corresponds to each PDU;
receiving, by the resource scheduler, the power usage data that corresponds to each PDU;
accessing data that correlates each computing host of a plurality of computing hosts to a particular port of the plurality of ports of the plurality of PDUs; and
based on the power usage data, generating a heat map image that quantifies relative temperatures of the plurality of computing hosts to one another.

9. A computing system, comprising:
one or more memories; and
one or more processor devices coupled to the one or more memories to:
receive, by a power distribution unit (PDU) interface system, from a monitoring system, a plurality of input requests that corresponds to a plurality of PDUs, each PDU comprising a respective plurality of ports, and, the input requests requesting power usage data associated with the plurality of PDUs, wherein each input request is associated with a corresponding PDU, the corresponding PDU being a particular PDU type of a plurality of PDU types, each input request having a same syntax for each of the PDU types;

determine, for each corresponding PDU, that the corresponding PDU is the particular PDU type of the plurality of PDU types;

for each corresponding PDU, based on the particular PDU type, initiate a PDU-type input command to the corresponding PDU, the PDU-type input command implementing the input request on the corresponding PDU and having a different syntax than the input request;

receive, from the plurality of PDUs, power usage data that corresponds to each PDU;

send, to the monitoring system, the power usage data that corresponds to each PDU;

receive, by the monitoring system, the power usage data that corresponds to each PDU, the power usage data comprising data values that identify one or more of:
  instantaneous temperature associated with each PDU of the plurality of PDUs; and
  instantaneous humidity associated with each PDU of the plurality of PDUs;

determine that one of the data values corresponds to one of the PDUs and exceeds a predetermined threshold;

access data that correlates each computing host of the plurality of computing hosts to a corresponding PDU of the plurality of PDUs;

identify, based on the data, a subset of computing hosts that receive power from the one of the PDUs; and send a message identifying the subset of computing hosts.

\* \* \* \* \*

UNITED STATES PATENT AND TRADEMARK OFFICE
CERTIFICATE OF CORRECTION

PATENT NO. : 10,579,032 B2
APPLICATION NO. : 15/903739
DATED : March 3, 2020
INVENTOR(S) : Joseph D. Talerico et al.

Page 1 of 1

It is certified that error appears in the above-identified patent and that said Letters Patent is hereby corrected as shown below:

In the Claims

On Column 17, Lines 10-11, replace:
"the corresponding PDU being a first particular PDU type of a plurality of PDU types"
With:
--"the corresponding PDU being a particular PDU type of a plurality of PDU types"--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*